United States Patent
Ono et al.

(10) Patent No.: US 12,354,801 B2
(45) Date of Patent: Jul. 8, 2025

(54) MULTI-LAYER CERAMIC ELECTRONIC COMPONENT

(71) Applicant: TAIYO YUDEN CO., LTD., Tokyo (JP)

(72) Inventors: Ryo Ono, Tokyo (JP); Jun Nishikawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 83 days.

(21) Appl. No.: 18/070,187

(22) Filed: Nov. 28, 2022

(65) Prior Publication Data

US 2023/0170142 A1    Jun. 1, 2023

(30) Foreign Application Priority Data

Nov. 29, 2021   (JP) .................................. 2021-192624

(51) Int. Cl.
| | | |
|---|---|---|
| *H01G 4/012* | (2006.01) | |
| *H01G 4/12* | (2006.01) | |
| *H01G 4/30* | (2006.01) | |

(52) U.S. Cl.
CPC ........... *H01G 4/012* (2013.01); *H01G 4/1209* (2013.01); *H01G 4/30* (2013.01)

(58) Field of Classification Search
CPC ......... H01G 4/1209; H01G 4/012; H01G 4/30
USPC ............. 361/301.4, 321.1, 311, 321.4, 321.2
See application file for complete search history.

(56) References Cited

U.S. PATENT DOCUMENTS

| | | | |
|---|---|---|---|
| 10,586,652 B1 * | 3/2020 | Kwon | H01G 4/224 |
| 2011/0141660 A1 * | 6/2011 | Jeong | H01G 4/12 |
| | | | 361/321.2 |
| 2012/0234462 A1 | 9/2012 | Matsui et al. | |
| 2013/0208399 A1 * | 8/2013 | Morita | H01G 4/30 |
| | | | 361/301.4 |
| 2013/0340920 A1 | 12/2013 | Matsui et al. | |
| 2014/0301012 A1 * | 10/2014 | Kim | H01G 4/1209 |
| | | | 361/301.4 |
| 2014/0301015 A1 * | 10/2014 | Kim | H01G 4/12 |
| | | | 29/25.03 |
| 2014/0345779 A1 | 11/2014 | Matsui et al. | |

(Continued)

FOREIGN PATENT DOCUMENTS

| | | |
|---|---|---|
| JP | 2012-209539 A | 10/2012 |
| JP | 2020-031152 A | 2/2020 |

*Primary Examiner* — Arun Ramaswamy
(74) *Attorney, Agent, or Firm* — CHEN YOSHIMURA LLP (57) ABSTRACT

A multi-layer ceramic electronic component includes a ceramic body including: a multi-layer unit including an electrode laminating unit including internal electrodes laminated in a first axis direction, covers covering the electrode laminating unit in the first axis direction, and covered surfaces perpendicular to a second axis, end portions of the internal electrodes being aligned on the covered surfaces within a range of 0.5 μm in the second axis direction; and side margins covering the covered surfaces and having a porosity of 3% or more in end regions. The ceramic body has a dimension in the first axis direction, which is 1.5 times or more a dimension in the second axis direction, and a proportion of an area of the electrode laminating unit to an entire cross-section perpendicular to a third axis and located at the center portion of the ceramic body in a third axis direction is 80% or more.

4 Claims, 6 Drawing Sheets

(56) References Cited

U.S. PATENT DOCUMENTS

| | | | |
|---|---|---|---|
| 2015/0348712 A1* | 12/2015 | Lee .......................... | H01G 4/30 |
| | | | 156/89.12 |
| 2018/0182555 A1* | 6/2018 | Kowase .................. | H01G 4/30 |
| 2018/0211784 A1* | 7/2018 | Ando ....................... | H01G 2/06 |
| 2020/0066455 A1 | 2/2020 | Sato | |
| 2020/0234879 A1* | 7/2020 | Aida ....................... | H01G 4/30 |
| 2020/0328030 A1 | 10/2020 | Sato | |

* cited by examiner

MULTI-LAYER CERAMIC ELECTRONIC COMPONENT

BACKGROUND ART

The present disclosure relates to a tall multi-layer ceramic electronic component.

In recent years, electronic apparatuses such as portable information terminals have been increasingly advanced and downsized. Along with this advance and downsizing, a multi-layer ceramic capacitor used for power storage or denoising in the above electronic apparatus needs a technique capable of increasing an electrostatic capacitance without expanding its mounting space on the mounting surface.

In view of this, in a ceramic body constituting the multi-layer ceramic capacitor, the thickness of a margin, which covers the circumference of an electrode laminating unit including laminated internal electrodes, is reduced, so that the electrode laminating unit can be enlarged by that thickness. This makes it possible to achieve a large capacitance without involving an increase in size of the multi-layer ceramic capacitor.

By way of example, there is known a technique capable of reducing the thickness of a side margin that covers the electrode laminating unit from a lateral direction (see, for example, Japanese Patent Application Laid-open No. 2012-209539). This technique makes it possible to reliably protect the internal electrodes by the side margin having a small thickness after providing a side margin having a uniform thickness in a later step.

Further, there is known a tall multi-layer ceramic capacitor in which the number of limited internal electrodes in the ceramic body is increased (see, for example, Japanese Patent Application Laid-open No. 2020-031152). Although such a multi-layer ceramic capacitor has an increased height on the mounting surface, the mounting space on the mounting surface can be kept small by maintaining the area of each internal electrode.

SUMMARY OF THE INVENTION

If the mounting space is kept small and an increase in capacitance is pursued, the proportion of the electrode laminating unit to the ceramic body is increased naturally, that is, the proportion of the margin is reduced. Thus, the shrinkage behavior of the electrode laminating unit is predominant at the time of sintering the ceramic body, and cracks are likely to be generated at the margin having a different shrinkage behavior from that of the electrode laminating unit.

In view of the circumstances as described above, it is desirable to provide a tall multi-layer ceramic capacitor capable of suppressing the occurrence of cracks.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, accorindg to one embodiment of the present disclosure, there is provided a multi-layer ceramic electronic component including a ceramic body.

The ceramic body includes a multi-layer unit including an electrode laminating unit including a plurality of internal electrodes laminated in a direction of a first axis, a pair of covers that cover the electrode laminating unit from both sides in the direction of the first axis, and a pair of covered surfaces that are perpendicular to a second axis orthogonal to the first axis, end portions of the plurality of internal electrodes in a direction of the second axis being aligned on the pair of covered surfaces within a range of 0.5 µm in the direction of the second axis, and a pair of side margins that cover the pair of covered surfaces and have a porosity of 3% or more in both end regions in the direction of the first axis.

The ceramic body has a dimension in the direction of the first axis, which is 1.5 times or more a dimension in the direction of the second axis, and a proportion of an area of the electrode laminating unit to an entire cross-section is 80% or more, the entire cross-section being perpendicular to a third axis orthogonal to the first axis and the second axis and located at the center portion of the ceramic body in a direction of the third axis.

This configuration enhances the porosity in both the end portions of the side margins in the direction of the first axis, the side margins constituting the ridges of the ceramic body, in which cracks are likely to occur at the time of sintering. This makes it possible to efficiently suppress the generation of cracks in the side margins even in a tall multi-layer ceramic electronic component having a large proportion of the electrode laminating unit.

A proportion of the number of the plurality of internal electrodes to the dimension of the electrode laminating unit in the direction of the first axis may be 800 layers/mm or more.

Each of the pair of side margins may have a lower porosity at the center region in the direction of the first axis than a porosity in both the end regions in the direction of the first axis. In this case, each of the pair of side margin may have a porosity less than 3% at the center region in the direction of the first axis.

Each of the pair of covers may have a lower porosity than a porosity in both the end regions of the pair of side margins in the direction of the first axis.

As described above, according to the present disclosure, it is possible to provide a tall multi-layer ceramic capacitor capable of suppressing the occurrence of cracks.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings. Note that in the figures, the X-axis, the Y-axis, and the Z-axis orthogonal to one another are shown as appropriate. The X-axis, the Y-axis, and the Z-axis are common in all figures.

1. Basic Configuration of Multi-layer Ceramic Capacitor 10

Figure 1:
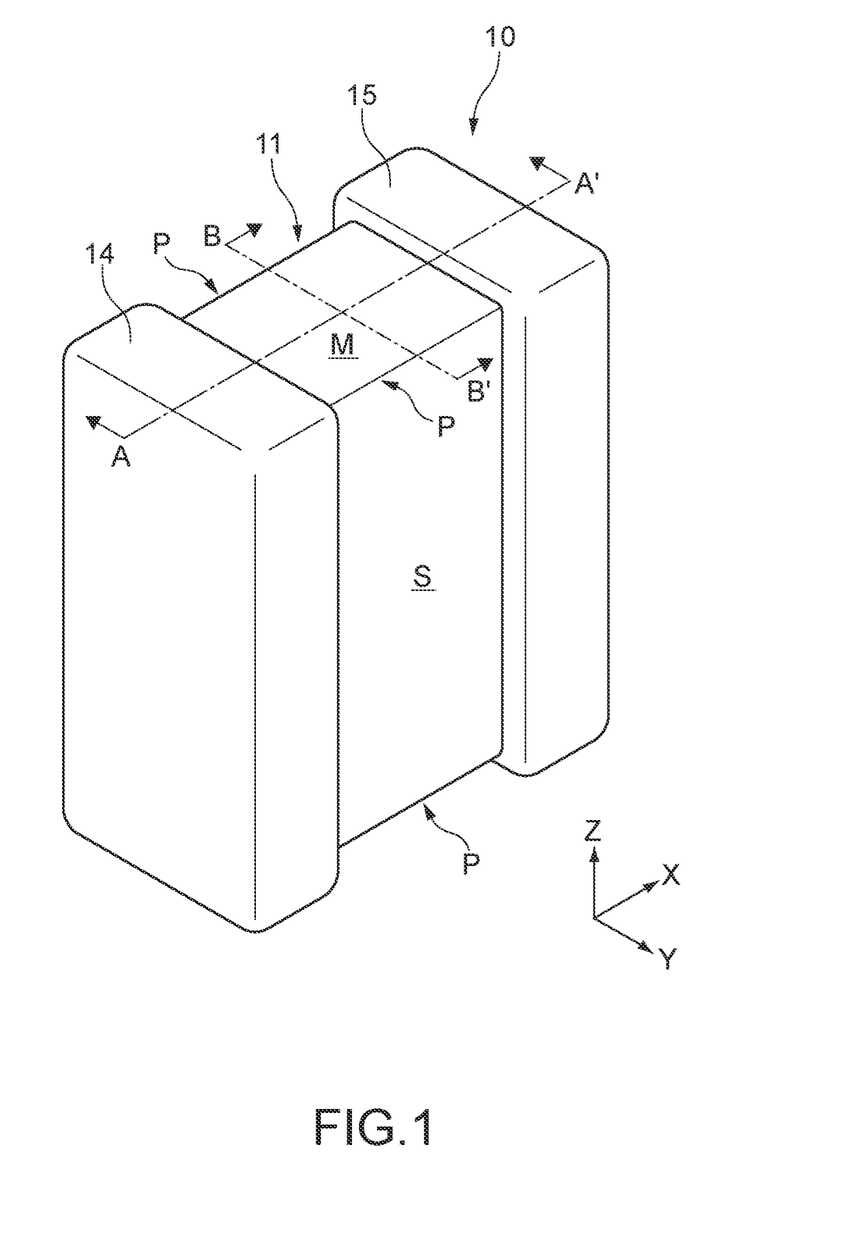
FIG. 1 is a perspective view of a multi-layer ceramic capacitor according to an embodiment of the present disclosure.
Figure 2:
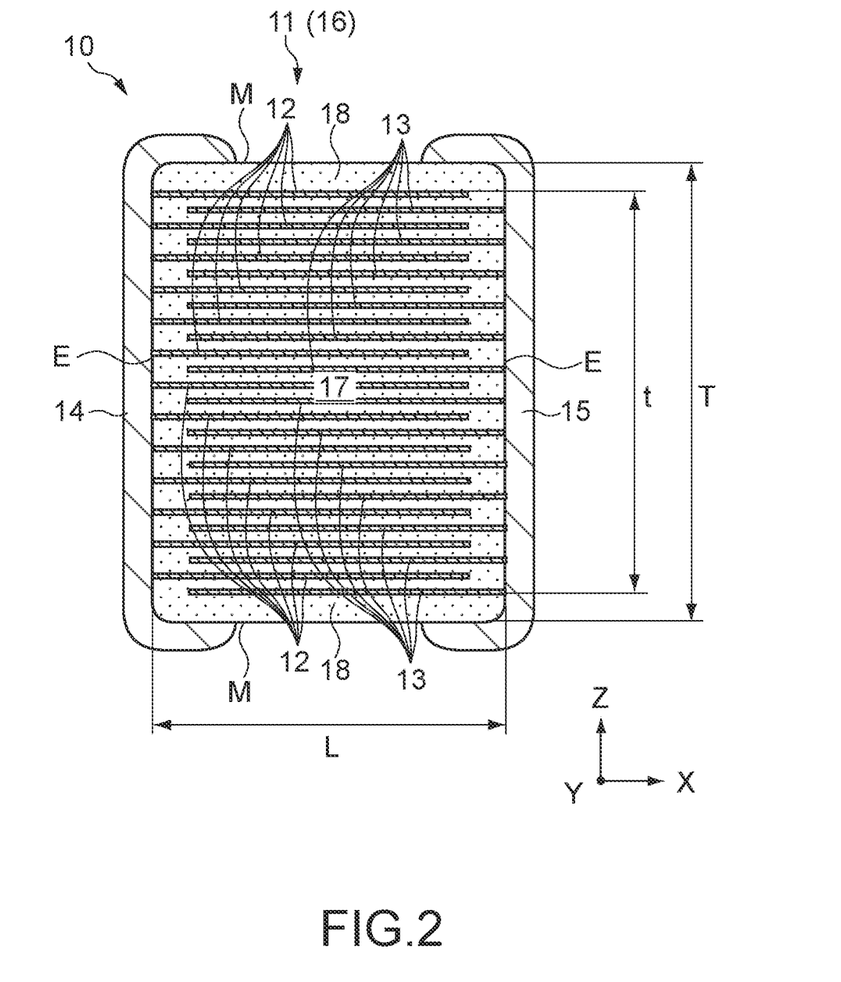
FIG. 2 is a cross-sectional view of the multi-layer ceramic capacitor taken along the line A-A' of FIG. 1.
Figure 3:
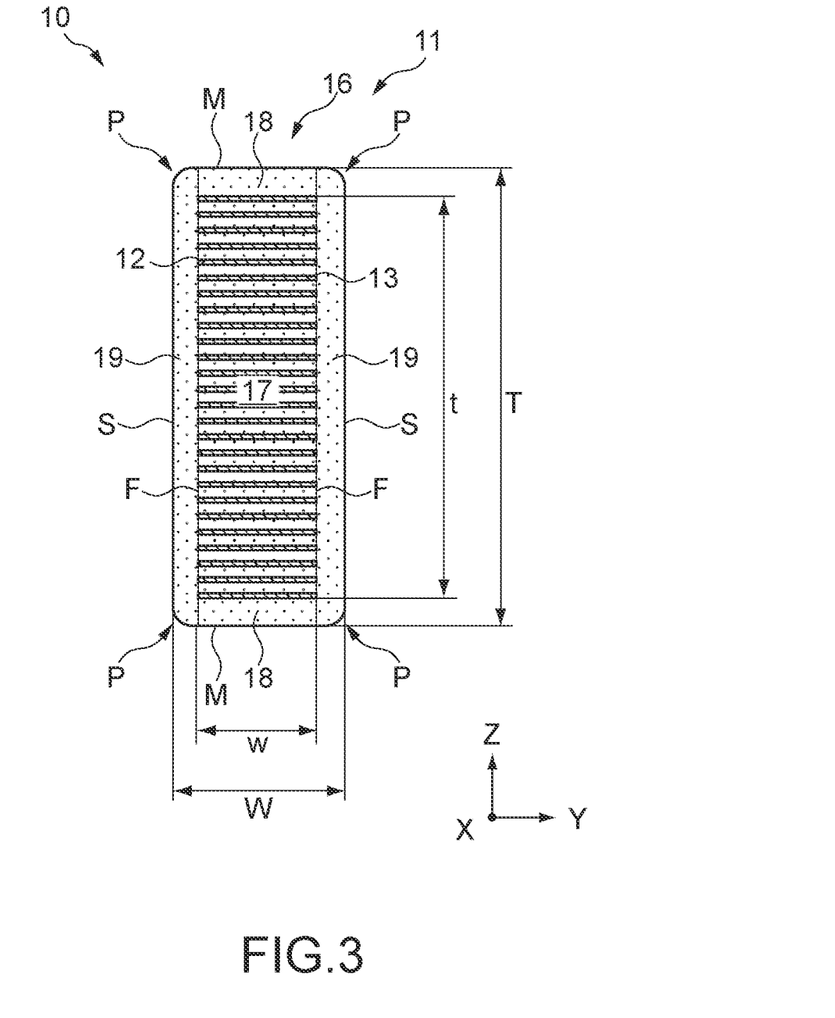
FIG. 3 is a cross-sectional view of the multi-layer ceramic capacitor taken along the line B-B' of FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the line A-A' of FIG. 1. FIG. 3 is a cross-sectional view of the multi-layer ceramic capacitor 10 taken along the line B-B' of FIG. 1.

The multi-layer ceramic capacitor 10 includes a ceramic body 11, a first external electrode 14, and a second external electrode 15. The ceramic body 11 is configured as a hexahedron including a pair of end surfaces E perpendicular to the X-axis, a pair of side surfaces S perpendicular to the Y-axis, and a pair of main surfaces M perpendicular to the Z-axis. The first and second external electrodes 14 and 15 cover the pair of end surfaces E of the ceramic body 11.

The multi-layer ceramic capacitor 10 is configured to have a high profile, i.e., to be tall, in which a dimension T of the ceramic body 11 in the Z-axis direction is larger than a dimension W of the ceramic body 11 in the Y-axis direction. In other words, the multi-layer ceramic capacitor 10 can be mounted in a mounting space limited in the Y-axis direction while increasing the dimension T of the ceramic body 11 to ensure a large capacitance.

Specifically, in the multi-layer ceramic capacitor 10, the dimension T is 1.5 times or more the dimension W. Further, a dimension L of the ceramic body 11 in the X-axis direction only needs to be larger than the dimension W and may be smaller than the dimension T. In the multi-layer ceramic capacitor 10, the dimensions T, W, and L of the ceramic body 11 can be optionally determined in the range satisfying the above conditions.

It is favorable that the planar shape of the multi-layer ceramic capacitor 10 along the mounting surface has the size equal to or larger than the 0201 size, in which the dimension in the X-axis direction is 0.25 mm, and the dimension in the Y-axis direction is 0.125 mm, and also has the size equal to or smaller than the 1608 size, in which the dimension in the X-axis direction is 1.6 mm, and the dimension in the Y-axis direction is 0.8 mm.

The first and second external electrodes 14 and 15, which cover the pair of end surfaces E of the ceramic body 11, extend from the respective end surfaces E to the pair of main surfaces M and the pair of side surfaces S of the ceramic body 11. With this configuration, the first and second external electrodes 14 and 15 have U-shaped cross-sections parallel to the X-Z plane and parallel to the X-Y plane.

Note that the shape of the first and second external electrodes 14 and 15 is not limited to that shown in FIGS. 1 and 2. For example, the first and second external electrodes 14 and 15 may respectively extend from the end surfaces E of the ceramic body 11 to one of the main surfaces M to have an L-shaped cross-section parallel to the X-Z plane. Alternatively, the first and second external electrodes 14 and 15 need not extend to any one of the main surfaces M and side surfaces S.

The first and second external electrodes 14 and 15 are formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like, and an alloy thereof.

The ceramic body 11 is formed of dielectric ceramics and includes a multi-layer unit 16 and a pair of side margins 19. The multi-layer unit 16 constitutes the main surfaces M and the end surfaces E of the ceramic body 11 and includes a pair of covered surfaces F facing in the Y-axis direction. The side margins 19 cover the respective covered surfaces F of the multi-layer unit 16 to constitute the side surfaces S of the ceramic body 11.

The multi-layer unit 16 has a laminated structure in which a plurality of ceramic layers are laminated in the Z-axis direction. The multi-layer unit 16 includes an electrode laminating unit 17 and a pair of covers 18. The electrode laminating unit 17 includes a plurality of first internal electrodes 12 and a plurality of second internal electrodes 13 that are disposed between the plurality of ceramic layers. The covers 18 cover the electrode laminating unit 17 from above and below in the Z-axis direction.

The covers 18 are defined as outer portions in the Z-axis direction from the first and second internal electrodes 12 and 13 located outermost in the Z-axis direction in the multi-layer unit 16. The electrode laminating unit 17 is defined as an inner portion in the Z-axis direction from the covers 18 in the multi-layer unit 16. FIG. 3 shows a dimension t of the electrode laminating unit 17 in the Z-axis direction and a dimension w of the electrode laminating unit 17 in the Y-axis direction.

The first and second internal electrodes 12 and 13 each have a sheet-like shape extending along the X-Y plane and are alternately disposed along the Z-axis direction. In the electrode laminating unit 17, the first internal electrodes 12 are drawn to one of the end surfaces E, and the second internal electrodes 13 are drawn to the other end surface E. Thus, the first and second internal electrodes 12 and 13 are connected to the first and second external electrodes 14 and 15, respectively.

Both end portions of the first and second internal electrodes 12 and 13 in the Y-axis direction are located on the covered surfaces F of the multi-layer unit 16, which are covered with the side margins 19. In the production process of the multi-layer ceramic capacitor 10, the covered surfaces F of the multi-layer unit 16 are formed as cut surfaces. Thus, both the end portions of the first and second internal electrodes 12 and 13 in the Y-axis direction are aligned on the covered surfaces F within the range of 0.5 μm in the Y-axis direction.

As described above, in the ceramic body 11, the covers 18 and the side margins 19 constitute a margin that protects the circumference of the electrode laminating unit 17 in which the first and second internal electrodes 12 and 13 are disposed. This makes it possible to mechanically protect the first and second internal electrodes 12 and 13 and also ensure the insulation properties between the first and second internal electrodes 12 and 13 in the multi-layer ceramic capacitor 10.

With the configuration described above, when a voltage is applied between the first external electrode 14 and the second external electrode 15 in the multi-layer ceramic capacitor 10, the voltage is applied to the plurality of ceramic layers disposed between the first and second internal electrodes 12 and 13. Thus, the multi-layer ceramic capacitor 10 stores charge corresponding to the voltage applied between the first external electrode 14 and the second external electrode 15.

In the ceramic body 11, in order to increase a capacitance of each ceramic layer provided between the first and second internal electrodes 12 and 13, dielectric ceramics having a high dielectric constant is used. Examples of the dielectric ceramics having a high dielectric constant include a material having a perovskite structure containing barium (Ba) and titanium (Ti), which is typified by barium titanate ($BaTiO_3$).

Note that the ceramic layers may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium zirconate ($BaZrO_3$), titanium oxide ($TiO_2$), or the like.

The first and second internal electrodes 12 and 13 are formed of a good conductor of electricity. Examples of the good conductor of electricity forming the first and second internal electrodes 12 and 13 typically include nickel (Ni), and in addition thereto, include a metal mainly containing copper (Cu), palladium (Pd), platinum (Pt), silver (Ag), gold (Au), or the like, and an alloy thereof 2. Detailed Configuration of Multi-layer Ceramic Capacitor 10

The multi-layer ceramic capacitor 10 according to this embodiment obtains a large capacitance by the configuration in which the proportion of the electrode laminating unit 17 to the ceramic body 11 is large. Specifically, in this embodiment, the proportion of the area of the electrode laminating unit 17 to the entire cross-section along the Y-Z plane is 80% or more at the center portion of the ceramic body 11 in the X-axis direction.

At the center portion of the cross-section in the X-axis direction shown in FIG. 3, the area of the ceramic body 11 is obtained by a product of the dimension T and the dimension W, and the area of the electrode laminating unit 17 is obtained by a product of the dimension t and the dimension w. Therefore, the proportion (%) of the area of the electrode laminating unit 17 to the area of the ceramic body 11 in the cross-section can be calculated by "$100 \times (t \times w)/(T \times W)$".

Meanwhile, in the ceramic body 11 in which the proportion of the electrode laminating unit 17 is large, the covers 18 and side margins 19, which serve as the margin covering the circumference of the electrode laminating unit 17, have a reduced thickness. This makes it easy to generate cracks in the covers 18 and the side margins 19 at the time of sintering the ceramic body 11 in the production process of the multi-layer ceramic capacitor 10.

In other words, the shrinkage behavior at the time of sintering the ceramic body 11 is largely different between the electrode laminating unit 17 in which the first and second internal electrodes 12 and 13 are disposed, and the covers 18 and side margins 19 in which the first and second internal electrodes 12 and 13 are not disposed. In the ceramic body 11 in which the covers 18 and the side margins 19 have a small thickness, the shrinkage behavior of the electrode laminating unit 17 is likely to be predominant.

For that reason, at the time of sintering the ceramic body 11, a large load tends to be applied to the covers 18 and the side margins 19, which have a different shrinkage behavior from that of the electrode laminating unit 17. Due to the load applied at the time of sintering, the stress is likely to concentrate at both end regions of each of the side margins 19 in the Z-axis direction, the side margins 19 constituting the ridges of the ceramic body 11 that extend along the X-axis direction.

In this regard, the multi-layer ceramic capacitor 10 according to this embodiment includes high porosity portions P, in which a large number of pores is present, in both end regions of each side margin 19 in the Z-axis direction. Here, both the end regions of each side margin 19 in the Z-axis direction represent only regions in the side margin 19, which are adjacent to the pair of covers 18 in the Y-axis direction, that is, do not include regions adjacent to the electrode laminating unit 17 in the Y-axis direction. This configuration effectively mitigates the stress generated in the side margins 19 when the high porosity portions P are flexibly deformed in the ceramic body 11 at the time of sintering.

Thus, at the time of sintering the ceramic body 11, it is possible to suppress the generation of cracks in both the end regions of each side margin 19 in the Z-axis direction, at which the stress easily concentrates. Therefore, in the multi-layer ceramic capacitor 10, the effect of the side margins 19 protecting the electrode laminating unit 17 is less likely to be impaired, and a failure such as a reduction in moisture resistance is less likely to occur.

Specifically, in the multi-layer ceramic capacitor 10, the high porosity portion P of the side margin 19 needs to have a porosity of 3% or more, and favorably has a porosity of 5% or more. The porosity is defined as a proportion of the toral area of all the pores to the cross-section at a target portion of the side margin 19.

For example, in an image of the cross-section of the side margin 19 captured using a scanning electron microscope (SEM) at a predetermined magnification (e.g., 10000 times), the porosity can be calculated as a proportion of the sum of cross-sectional areas of all the pores present in a predetermined region to the area of the predetermined region. The porosity may be obtained as the mean of the values calculated for a plurality of regions.

In order to obtain a large capacitance, the multi-layer ceramic capacitor 10 favorably includes a large number of laminated ceramic layers in the electrode laminating unit 17, that is, a large number of first and second internal electrodes 12 and 13. Specifically, in the multi-layer ceramic capacitor 10, a proportion of the total number of first and second internal electrodes 12 and 13 to the dimension t of the electrode laminating unit 17 is favorably 800 layers/mm or more, more favorably 900 layers/mm or more.

Further, in the side margin 19, the high porosity portion P is favorably provided at a position adjacent to the cover 18 in the Y-axis direction. On the other hand, in the side margin 19, the porosity in the portion adjacent to the electrode laminating unit 17 in the Y-axis direction is favorably as low as possible in order to more reliably protect the electrode laminating unit 17 in which the first and second internal electrodes 12 and 13 are disposed.

Thus, in the side margin 19, the high porosity portions P are favorably located at only both the end regions in the Z-axis direction, and the porosity of the center region in the Z-axis direction is favorably smaller than that of the high porosity portion P. Specifically, the porosity of the center region of the side margin 19 in the Z-axis direction is favorably less than 3%, more favorably 2% or less. Similarly, from the viewpoint of protecting the electrode laminating unit 17 more reliably, the porosity of the cover 18 is favorably smaller than that of the high porosity portion P.

3. Method of Producing Multi-Layer Ceramic Capacitor 10

Figure 4:
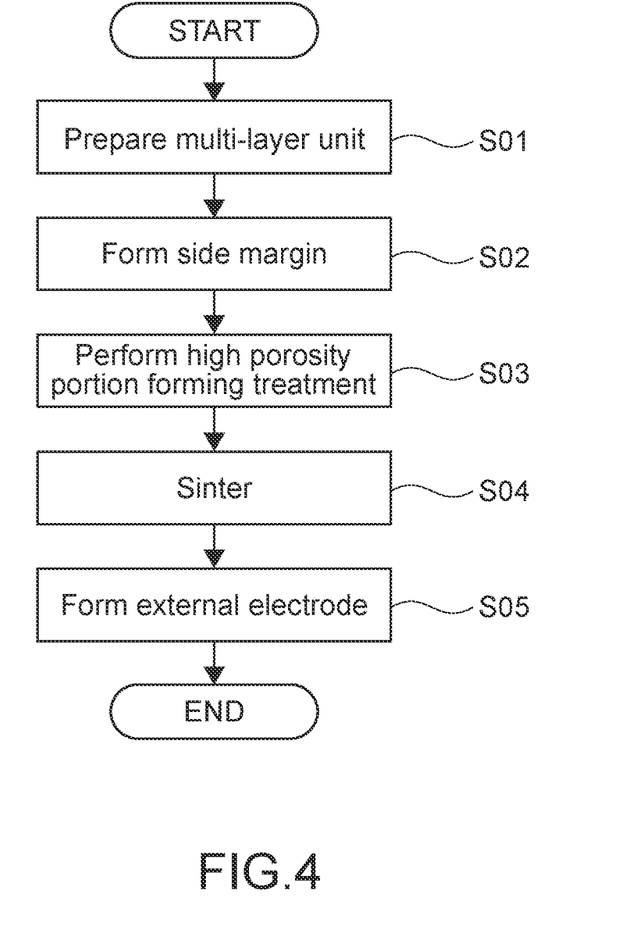
FIG. 4 is a flowchart showing a method of producing the multi-layer ceramic capacitor.
Figure 5:
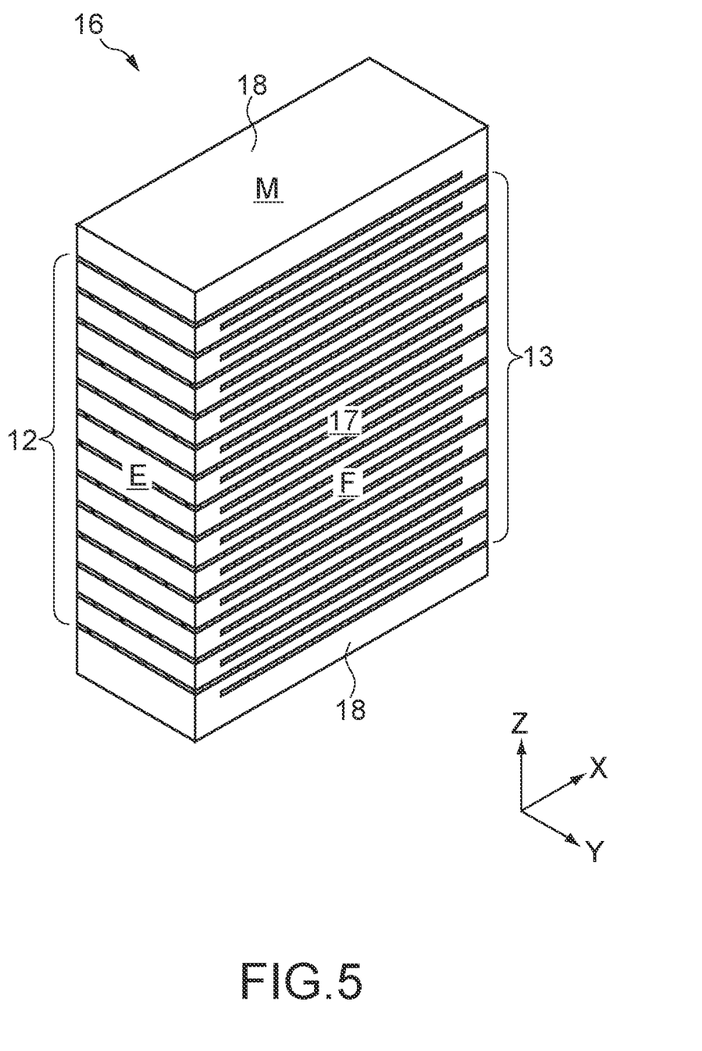
FIG. 5 is a perspective view of a multi-layer unit prepared in Step S01.
Figure 6:
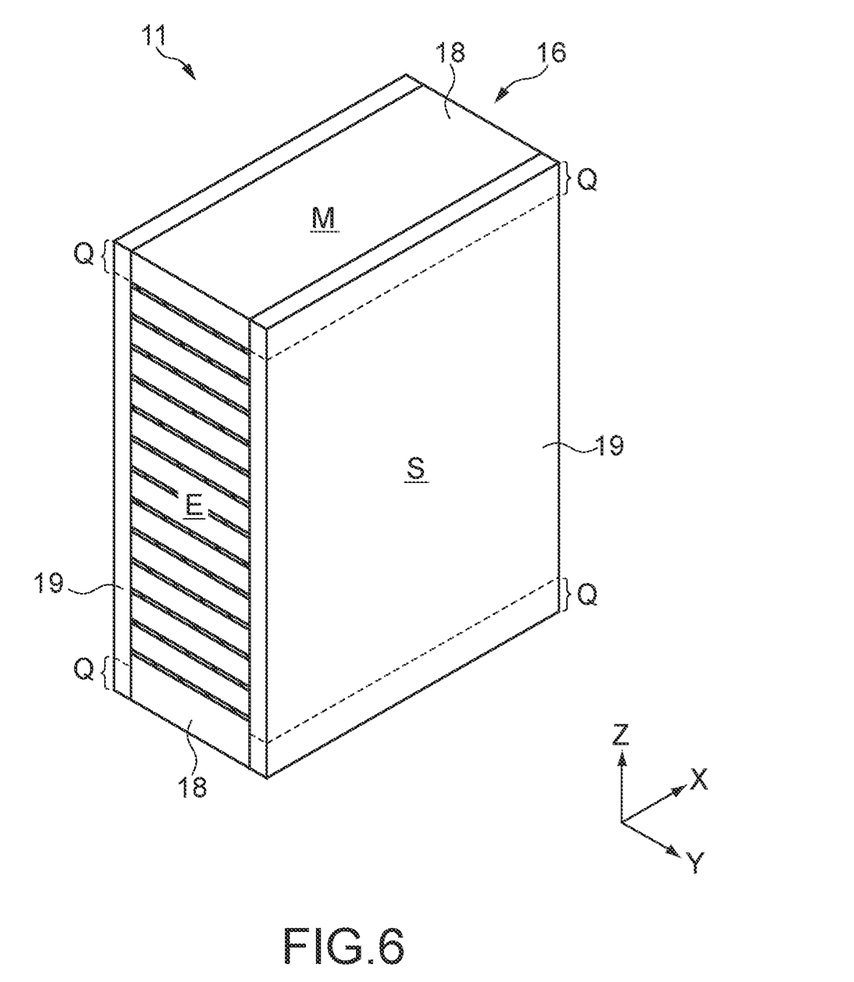
FIG. 6 is a perspective view of an unsintered ceramic body obtained in Step S02.

FIG. 4 is a flowchart showing a method of producing the multi-layer ceramic capacitor 10 according to this embodiment. FIGS. 5 and 6 are views each showing the process of producing the multi-layer ceramic capacitor 10. Hereinafter, the method of producing the multi-layer ceramic capacitor 10 will be described along FIG. 4 with reference to FIGS. 5 and 6 as appropriate.

3.1 Step S01: Preparation of Multi-layer Unit

In Step S01, an unsintered multi-layer unit 16 shown in FIG. 5 is prepared. The unsintered multi-layer unit 16 can be produced using a multi-layer sheet in which a plurality of large-sized ceramic sheets are laminated in the Z-axis direction. An electrically conductive paste for forming the first and second internal electrodes 12 and 13 is patterned on the ceramic sheets corresponding to the electrode laminating unit 17.

The unsintered multi-layer unit 16 is obtained by cutting the above-mentioned multi-layer sheet along the X-Z plane and the Y-Z plane. For example, a cutting device including a push-cutting blade, a rotary blade, or the like can be used to cut the multi-layer sheet. In such a manner, the multi-layer unit 16 is provided with the pair of covered surfaces F as cut surfaces on which the end portions of the first and second internal electrodes 12 and 13 in the Y-axis direction are aligned.

3.2 Step S02: Formation of Side Margin

In Step S02, a pair of unsintered side margins 19 are provided to the pair of covered surfaces F of the unsintered multi-layer unit 16 obtained in Step S01. With this configuration, an unsintered ceramic body 11 in which the unsintered side margins 19 constitute the pair of side surfaces S is obtained as shown in FIG. 6.

The side margin 19 can be formed by any method. The side margin 19 can be formed by, for example, using a ceramic sheet that is a dielectric green sheet. In this case, for example, the ceramic sheet can be punched with the covered surface F of the multi-layer unit 16 or can be cut in advance and attached to the covered surface F of the multi-layer unit 16.

Further, in order to form the side margins 19, ceramic slurry that has not shaped can also be used instead of the ceramic sheets formed into a sheet-like shape in advance. In this case, the ceramic slurry can be applied to the covered surfaces F of the multi-layer unit 16 by, for example, immersing the covered surfaces F of the multi-layer unit 16 into the ceramic slurry.

3.3 Step S03: High Porosity Portion Forming Treatment

In Step S03, each side margin 19 of the unsintered ceramic body 11 obtained in Step S02 is subjected to high porosity portion forming treatment for forming the high porosity portions P. For the high porosity portion forming treatment, any publicly known technique can be used, but for example, treatment of reducing the filling rate of ceramic particles in both end regions Q of the side margin 19 can be used.

Examples of the treatment of reducing the filling rate of ceramic particles in both end regions Q of the side margin 19 include acid treatment to melt part of the ceramic particles by using acid. This acid treatment can be performed by, for example, immersing both the end regions Q of the side margin 19 into the acid containing fluorine, such as hydrofluoric acid.

3.4 Step S04: Sintering

In Step S04, the ceramic body 11, in which the side margins 19 are subjected to the high porosity portion forming treatment in Step S03, is sintered to produce the ceramic body 11 of the multi-layer ceramic capacitor 10 shown in FIGS. 1 to 3. Thus, the high porosity portion P is formed in each of both the end regions Q of the pair of side margins 19 in the Z-axis direction.

A sintering temperature in Step S04 can be determined on the basis of a sintering temperature of the ceramic body 11. For example, if a barium titanate ($BaTiO_3$) based material is used, the sintering temperature can be set to approximately 1000 to 1300° C. Further, sintering can be performed in a reduction atmosphere or a low-oxygen partial pressure atmosphere, for example.

3.5 Step S05: Formation of External Electrode

In Step S05, the first and second external electrodes 14 and 15 are formed in both the end portions of the ceramic body 11 in the X-axis direction obtained in Step S04, to produce the multi-layer ceramic capacitor 10 shown in FIGS. 1 to 3. The method of forming the first and second external electrodes 14 and 15 in Step S05 is optionally selectable from publicly known methods.

Through the above steps, the multi-layer ceramic capacitor 10 is completed. In this production method, the side margins 19 are formed on the covered surfaces F of the multi-layer unit 16, from which the first and second internal electrodes 12 and 13 are exposed. Thus, the end portions of the first and second internal electrodes 12 and 13 in the Y-axis direction in the ceramic body 11 are aligned within the range of 0.5 μm in the Y-axis direction.

4. Other Embodiments

While the embodiment of the present disclosure has been described, the present disclosure is not limited to the embodiment described above, and it should be appreciated that the present disclosure may be variously modified.

For example, the multi-layer ceramic capacitor 10 has been described in the above embodiment as an example of a multi-layer ceramic electronic component, but the present disclosure is applicable to any other multi-layer ceramic electronic components. Examples of such multi-layer ceramic electronic components include a chip varistor, a chip thermistor, and a multi-layer inductor.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic electronic component, comprising:
   a ceramic body including
      a multi-layer unit including
         an electrode laminating unit including a plurality of internal electrodes laminated in a direction of a first axis,
         a pair of covers that cover the electrode laminating unit from both sides in the direction of the first axis, and
         a pair of covered surfaces that are perpendicular to a second axis orthogonal to the first axis, end portions of the plurality of internal electrodes in a direction of the second axis being aligned on the pair of covered surfaces within a range of 0.5 μm in the direction of the second axis, and
      a pair of side margins that cover the pair of covered surfaces and have a porosity of 3% or more in both end regions in the direction of the first axis, a porosity of a center region in the direction of the first axis in each of the pair of side margins being different from the porosity in both the end regions, the center region and the end regions being located directly on a virtual line extending in the direction of the first axis so as to be aligned with each other in the direction of the first axis, wherein:

the ceramic body has a dimension in the direction of the first axis, which is 1.5 times or more a dimension in the direction of the second axis, a proportion of an area of the electrode laminating unit to an entire cross-section is 80% or more, the entire cross-section being perpendicular to a third axis orthogonal to the first axis and the second axis and located at a center portion of the ceramic body in a direction of the third axis, and each of the pair of covers has a lower porosity than a porosity in both the end regions of the pair of side margins in the direction of the first axis.

2. The multi-layer ceramic electronic component according to claim 1, wherein a proportion of the number of the plurality of internal electrodes to the dimension of the electrode laminating unit in the direction of the first axis is 800 layers/mm or more.

3. A multi-layer ceramic electronic component, comprising:

a ceramic body including
    a multi-layer unit including
        an electrode laminating unit including a plurality of internal electrodes laminated in a direction of a first axis,
        a pair of covers that cover the electrode laminating unit from both sides in the direction of the first axis, and
        a pair of covered surfaces that are perpendicular to a second axis orthogonal to the first axis, end portions of the plurality of internal electrodes in a direction of the second axis being aligned on the pair of covered surfaces within a range of 0.5 μm in the direction of the second axis, and
    a pair of side margins that cover the pair of covered surfaces and have a porosity of 3% or more in both end regions in the direction of the first axis, wherein:

the ceramic body has a dimension in the direction of the first axis, which is 1.5 times or more a dimension in the direction of the second axis, a proportion of an area of the electrode laminating unit to an entire cross-section is 80% or more, the entire cross-section being perpendicular to a third axis orthogonal to the first axis and the second axis and located at a center portion of the ceramic body in a direction of the third axis, each of the pair of side margins has a lower porosity at a center region in the direction of the first axis than the porosity in both the end regions in the direction of the first axis, the center region and the end regions being located directly on a virtual line extending in the direction of the first axis so as to be aligned with each other in the direction of the first axis, and each of the pair of covers has a lower porosity than a porosity in both the end regions of the pair of side margins in the direction of the first axis.

4. The multi-layer ceramic electronic component according to claim 3, wherein each of the pair of side margins has a porosity less than 3% at the center region in the direction of the first axis.

* * * * *